US008731835B2

(12) United States Patent
Chidlovskii et al.

(10) Patent No.: US 8,731,835 B2
(45) Date of Patent: May 20, 2014

(54) SYSTEM AND METHOD FOR TRIP PLAN CROWDSOURCING USING AUTOMATIC FARE COLLECTION DATA

(75) Inventors: Boris Chidlovskii, Meylan (FR); Luis Rafael Ulloa Paredes, Meylan (FR)

(73) Assignee: Xerox Corporation, Norwalk, CT (US)

( * ) Notice: Subject to any disclaimer, the term of this patent is extended or adjusted under 35 U.S.C. 154(b) by 194 days.

(21) Appl. No.: 13/480,612

(22) Filed: May 25, 2012

(65) Prior Publication Data
US 2013/0317747 A1 Nov. 28, 2013

(51) Int. Cl.
G01C 21/00 (2006.01)
(52) U.S. Cl.
USPC ............ 701/540; 701/410; 701/424; 701/521
(58) Field of Classification Search
USPC ............. 701/1, 117–120, 400, 408, 409, 410, 701/423, 424, 454, 461, 521, 527, 532, 533, 701/540
See application file for complete search history.

(56) References Cited

U.S. PATENT DOCUMENTS

| 8,560,238 | B2 * | 10/2013 | Keerthi | 701/537 |
|---|---|---|---|---|
| 8,594,931 | B2 * | 11/2013 | Sterkel et al. | 701/454 |
| 2006/0293046 | A1 * | 12/2006 | Smith | 455/423 |
| 2013/0117057 | A1 * | 5/2013 | Van Moltke et al. | 705/7.13 |
| 2013/0226456 | A1 * | 8/2013 | Keerthi | 701/537 |
| 2013/0311090 | A1 * | 11/2013 | Keerthi | 701/533 |
| 2014/0019867 | A1 * | 1/2014 | Lehtiniemi et al. | 715/738 |

OTHER PUBLICATIONS

U.S. Appl. No. 13/351,560, filed Jan. 17, 2012, entitled, "Location-Type Tagging Using Collected Traveler Data," by Guillaume M. Bouchard et al.
Neal Lathia et al., "Mining Public Transport Usage for Personalised Intelligent Transport Systems," ICDM, pp. 887-892, 2010.
Brian Caulfield et al., "An Examination of the Public Transport Information Requirements of Users," IEEE Transactions on Intelligent Transportation Systems, vol. 8, No. 1, pp. 21-30, Mar. 2007.
Jeff Howe, "The Rise of Crowdsourcing," Wired Magazine, Jun. 2006.
Alex Cui, "Bus Passenger Origin-Destination Matrix Estimation Using Automated Data Collection Systems," in MIT, Dept. of Civil and Environmental Engineering, MS thesis, 2006.

(Continued)

Primary Examiner — Rami Khatib
(74) Attorney, Agent, or Firm — Fay Sharpe LLP

(57) ABSTRACT

A method and system are disclosed for trip planning using crowdsourcing. Validation information from automatic ticketing validation systems is collected and used to generate validation sequences, which include an origin, destination, and boarding and alighting timestamps. A path is defined from the validation sequence as a sequence of origins and destinations on a transportation network. The frequency of the path occurring for all travelers on the network is determined, along with the duration of travel time on the path. An expected transfer time between pairs of stations on the network is calculated from the duration, the pairs of stations corresponding to an origin and a destination in the sequence. One or more paths between a pair of stations corresponding to a selected origin and destination are identified and a trip plan is generated using the identified paths which have the least determined transfer time and the highest frequency of occurrences.

23 Claims, 10 Drawing Sheets

(56) References Cited

OTHER PUBLICATIONS

Bruno Agard et al., "Mining Public Transport User Behaviour from Smart Card Data," in 12th IFAC Symposium on Information Control Problems in Manufacturing, INCOM, 2006, Saint-Etienne, France, May 17-19, 2006.

Nicholas Evangelopoulos et al., "Text-Mining the Voice of the People," Communications of the ACM, vol. 55, No. 2, pp. 62-69, Feb. 2012.

Markus Hofmann et al., "Transfer Journey Identification and Analyses from Electronic Fare Collection Data," pp. 825-830, in Proceedings of the 8th International IEEE Conference on Intelligent Transportation Systems, Vienna, Austria, Sep. 13-16, 2005.

Dimitra Anastasiou et al., "Comparison of Crowdsourcing Translation with Machine Translation," Journal of Information Science, 37(6), pp. 637-659, Dec. 2011.

U.S. Appl. No. 13/481,042, filed May 25, 2012, entitled, "System and Method for Estimating Origins and Destinations From Identified End-Point Time-Location Stamps," by Ulloa Paredes et al.

U.S. Appl. No. 13/480,802, filed May 25, 2012, entitled, "System and Method for Estimating a Dynamic Origin-Destination Matrix," by Boris Chidlovskii.

\* cited by examiner

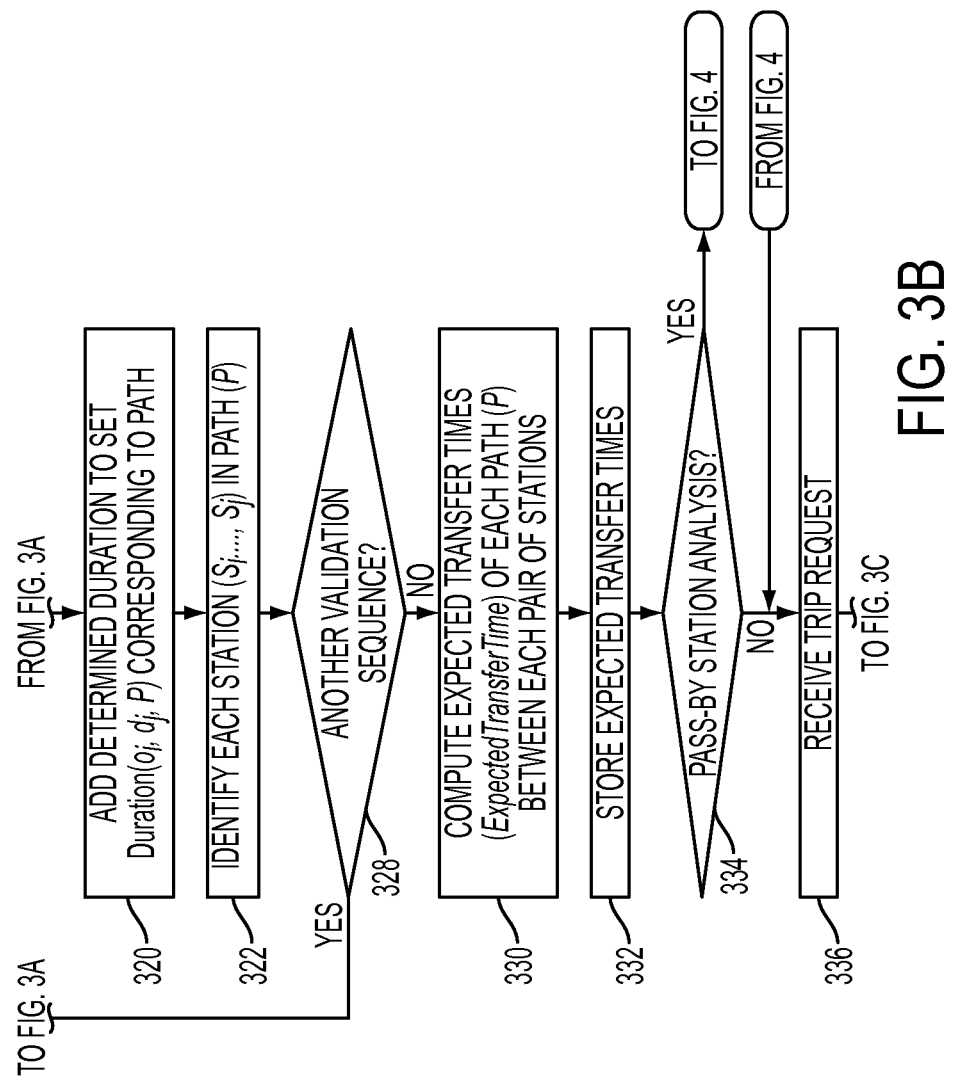

SYSTEM AND METHOD FOR TRIP PLAN CROWDSOURCING USING AUTOMATIC FARE COLLECTION DATA

BACKGROUND

The following relates to the transportation arts, tracking arts, data processing and data management arts.

Intelligent transportation systems may use real time information to assist public transport agencies in decision making. Such intelligent transportation systems may incorporate automatic data collection subsystems so as to monitor vehicle ridership along a route and allow for the periodic adjustment of headway plans, in order to improve the quality of service and to make the transportation system more attractive to the travelers.

Previous attempts to monitor and modify transportation systems made use of expensive and time-consuming procedures, such as household surveys and roadside interviews. Intelligent transportation systems, in contrast, allow the incorporation of sensor- and detector-based technologies, which enable the collection of large amounts of traveler information in real-time, which may then be processed to facilitate more efficient planning by associated transportation system personnel. Urban public transportation networks often deploy automatic ticketing validation systems, which can serve as sensors.

A public transport trip planner, or journey planner, may be designed to provide information about available public transport journeys or routes along the public transportation system, for example via a Web-based application. Such an application may prompt a prospective traveler to input an origin and a destination, and then use a trip planning engine to determine a route between the two input locations using specified available public transportation services and routes, e.g., buses, trams, trains, etc., depending on available schedules for these services. Accordingly, transportation authorities may include such a public transport journey planner on their websites, London for example, has a multi-modal journey planner covering all modes of public transport in London, including bus, tube and rail, as described more fully in "Mining public transport usage for personalised intelligent transport systems," Neal Lathia, Jon Froehlich, and Licia Capra, *ICDM*, pages 887-892, 2010. A similar trip planner with all modes included is maintained by the Helsinki Metropolitan Area Council in Finland, as described more fully in "An examination of the public transport information requirements of users," Brian Caulfield and Margaret O'Mahony, *IEEE Transactions on Intelligent Transportation Systems*, 8(1):21-30, 2007.

A trip planner may find one or more suggested paths between an origin and a destination. The origin and destination may be specified as geospatial coordinates or names of points of access to public transport such as bus stops, stations, airports or ferry ports. A location finding process may resolve the origin and destination into the nearest known nodes on the transport network in order to compute a trip plan over its data set of known paths, i.e., routes. Trip planners for large networks may use a search algorithm to search a graph of nodes (representing access points to the transport network) and edges (representing possible journeys between points). Different weightings such as distance, cost or accessibility may be associated with each edge. When suggesting the journey or trip plans, the trip planner uses the abstract model of the public transportation network and those plans may not reflect the trips that travelers make every day on these routes. Accordingly, traffic jams, traveler congestion, delays, crowding, and the like, are not taken into account when determining the routes provided by the trip planner.

Thus, it would be advantageous to provide a method and system which reflect traveler patterns of behavior for trip planning.

INCORPORATION BY REFERENCE

The following references, the disclosures of which are incorporated herein by reference, in their entirety, are mentioned.

U.S. patent application Ser. No. 13/351,560, filed Jan. 17, 2012, entitled LOCATION-TYPE TAGGING USING COLLECTED TRAVELER DATA, by Guillaume M. Bouchard, et al.

U.S. patent application Ser. No. 13/480,802, filed May 25, 2012, entitled SYSTEM AND METHOD FOR ESTIMATING A DYNAMIC ORIGIN-DESTINATION MATRIX, by Boris Chidlovskii.

U.S. patent application Ser. No. 13/481,042, filed May 25, 2012, entitled SYSTEM AND METHOD FOR ESTIMATING ORIGINS AND DESTINATIONS FROM IDENTIFIED END-POINT TIME-LOCATION STAMPS, by Luis Rafael Ulloa Paredes and Guillaume M. Bouchard.

BRIEF DESCRIPTION

In accordance with one aspect of the exemplary embodiment, a method for crowdsourcing a transportation network includes acquiring validation sequences for each of a plurality of travelers on the transportation network during a training period, at least some of the validation sequences including a plurality of origins, a plurality of destinations, and boarding and alighting timestamps corresponding thereto. The method further includes, with a processor, defining a validation sequence path as a sequence of successive origins and destinations for each of the generated validation sequences, and determining a frequency of each validation sequence path occurring during the training period. The method also includes calculating a duration of each validation sequence path in accordance with the boarding and alighting timestamps associated therewith, and computing an expected transfer time for each validation sequence path between a first of the origins and a last of the destinations on the transportation network from the corresponding determined durations for a plurality of the validation sequences. In addition, the method includes storing crowdsource information corresponding to each validation sequence path in an associated database, the crowdsource information including the determined frequency of occurrence and the expected transfer time.

In another aspect, a trip planning system includes a sequence generator component, a path generator component, a crowdsourcing component, a trip planner component, and a processor which implements at least one of the sequence generator component, the path generator component, the crowdsourcing component and the trip planning component. The sequence generator component of the system is configured to generate validation sequences for each of a plurality of travelers on a transportation network during a training period, at least some of the validation sequences including a plurality of origins, a plurality of destinations, and boarding and alighting timestamps corresponding thereto. The path generator component is configured to define validation sequence path as a sequence of successive origins and destinations for each of the generated validation sequences. The crowdsourcing component is configured to determine a frequency of each validation sequence path occurring during the training period, calculate a duration of each validation sequence path in accordance with the boarding and alighting timestamps associated therewith, compute an expected transfer time for each validation sequence path between a first of the origins and a last of the destinations on the transportation network from the corresponding determined durations for a plurality of the validation sequences, and to store crowdsource information corresponding to each validation sequence path including the determined frequency of occurrence, and expected transfer time in an associated database. The trip planning component of the system is configured to receive, from an associated user device, a trip request including an origin, a destination, and a time of departure. The trip planning component is also configured to identify at least one validation sequence path corresponding to the requested origin and the destination, and to generate a trip plan from the origin to the destination in accordance with the at least one identified validation sequence path between in accordance with the crowdsource information.

In another aspect, a computer-implemented method for trip planning on a transportation network, includes receiving, from an associated user device, a trip request including an origin, a destination, and a time of departure. The computer-implemented method further includes identifying a pair of stations on the transportation network respectively corresponding to the origin and the destination, and retrieving a validation sequence path between the identified pair of stations corresponding to the requested origin and the destination. In addition, the method includes retrieving generated crowdsource information corresponding to the retrieved validation sequence path. The method also includes outputting, with a processor, a trip plan from the origin to the destination in accordance with at least one validation sequence path between the pair of stations selected in accordance with the retrieved crowdsource information.

BRIEF DESCRIPTION OF THE DRAWINGS

FIGS. 3A-3C is a flowchart which illustrates part of a method for crowdsourcing a trip on a transportation network.

DETAILED DESCRIPTION

Figure 1A:
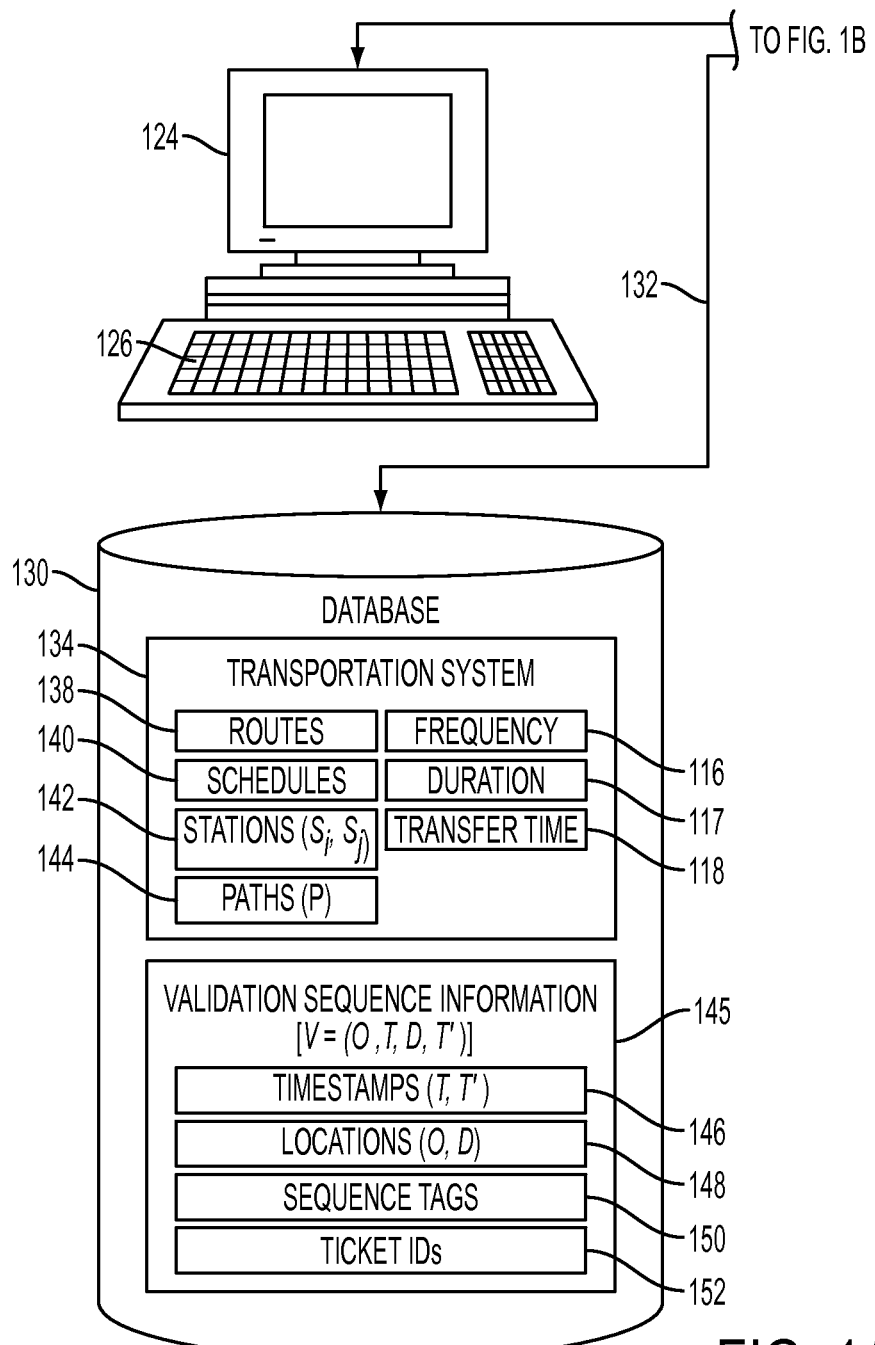
FIGS. 1A-1C is a functional block diagram of a crowdsourcing system for trip planning using validation data.

One or more implementations of the subject application will now be described with reference to the attached drawings, wherein like reference numerals are used to refer to like elements throughout.

As described herein, there is provided a method for planning a trip on a public transportation system using crowdsourcing of validation sequence information from travelers. In one embodiment, during a training period, a validation sequence is collected for every traveler using the transportation system, based on ticket identification, which sequence includes an origin, time of departure, a destination, and time of arrival. This sequence may be used to determine a probable path that the traveler took from the origin to the destination, the frequency of travelers using this path, and the expected transfer time (time from boarding at the origin to alighting at the destination). The more frequent paths may be used by a trip planner component to then determine which paths from a selected origin to a selected destination are most commonly used by travelers on the transportation system.

Figure 1B:
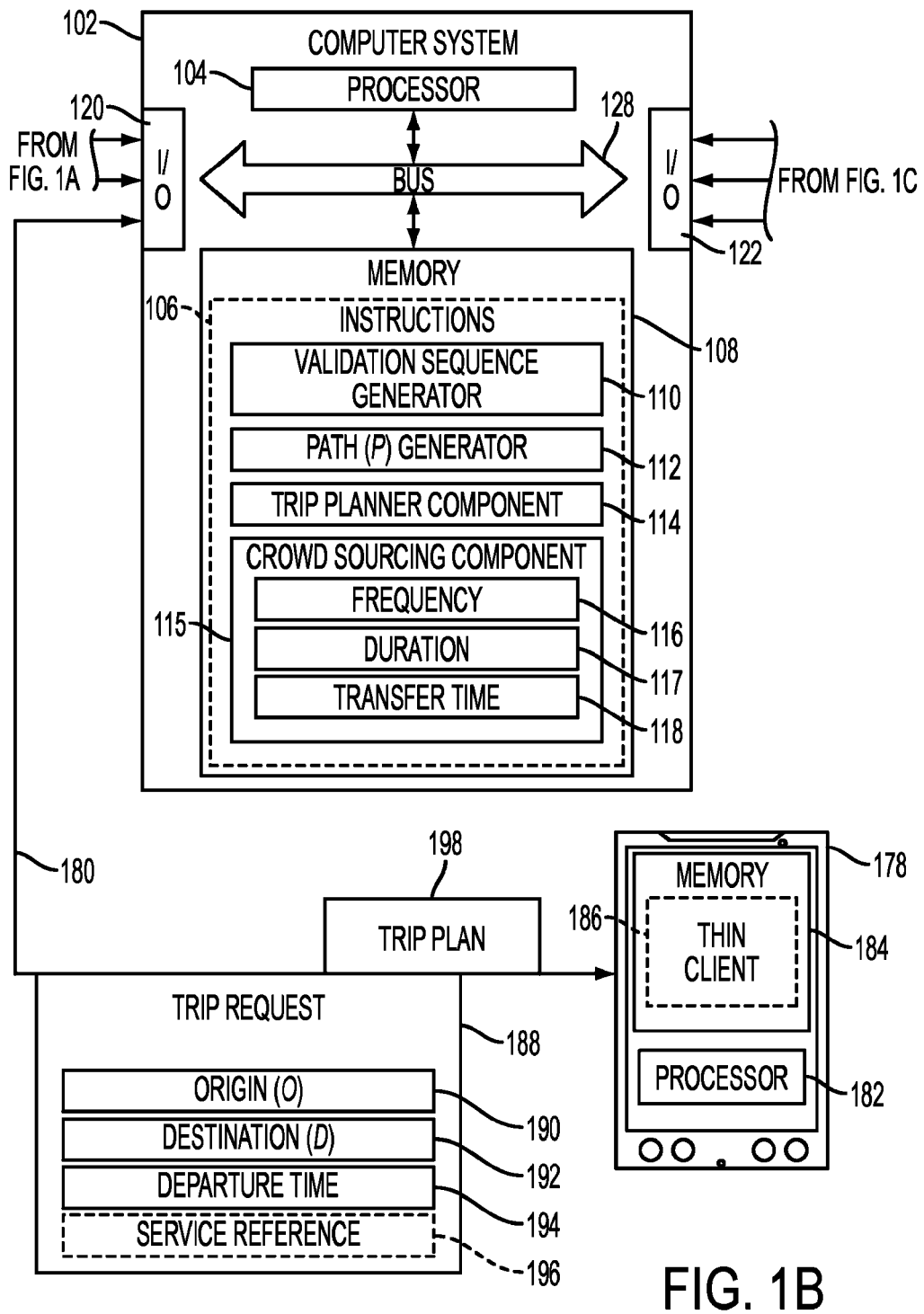
Figure 1C:
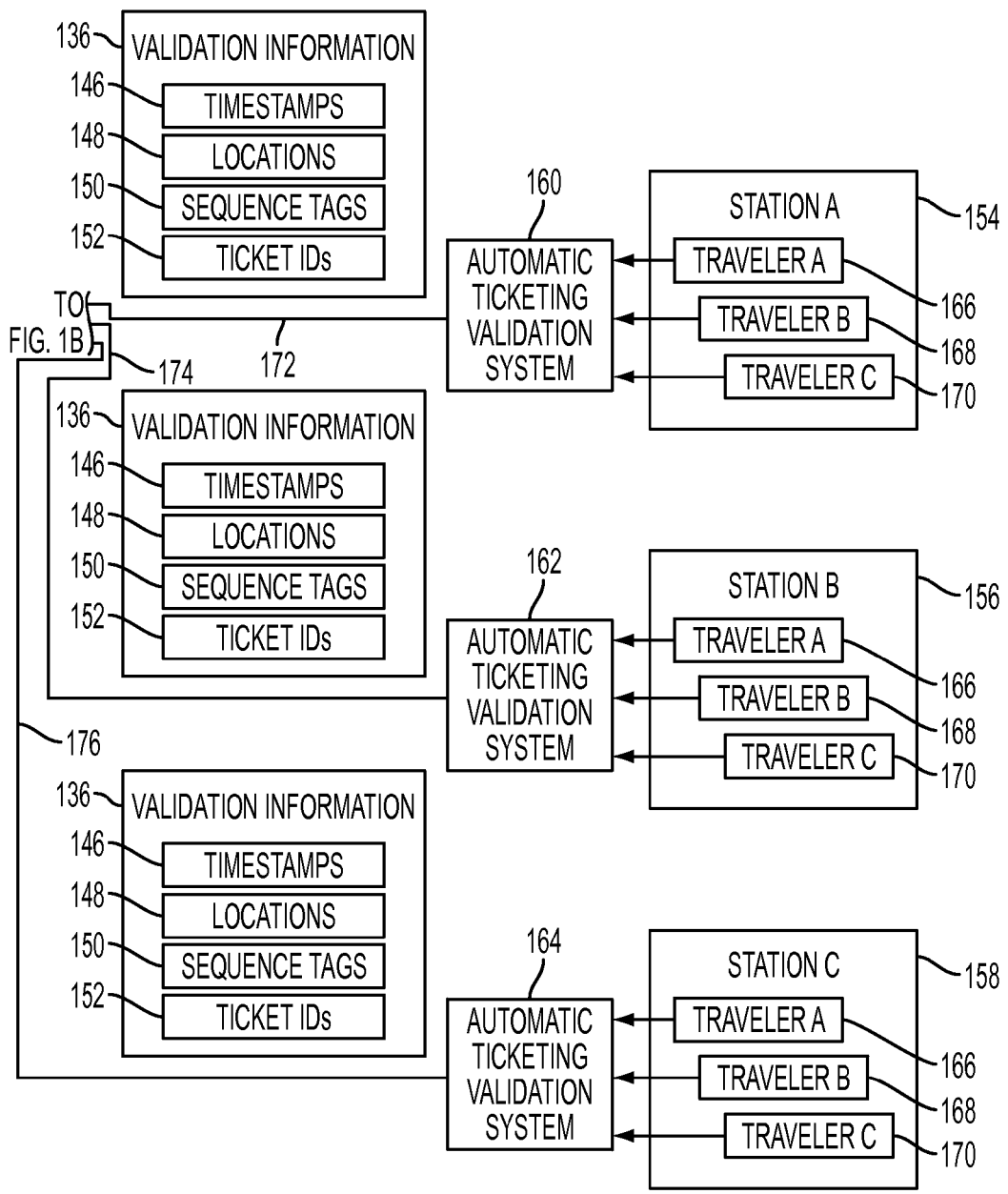

Referring now to FIGS. 1A-1C, there is shown a crowdsourcing trip planning system 100 capable of providing one or more paths on a public transportation system between a selected origin and destination. Such origins and destinations may correspond to stations, or nodes, on the public transportation system. It will be appreciated that the various components depicted in FIG. 1 are for purposes of illustrating aspects of the exemplary embodiment, and that other similar components, implemented via hardware, software, or a combination thereof, are capable of being substituted therein.

It will be appreciated that the trip planning system 100 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIGS. 1A-1C as a networked set of components, the system and method are capable of implementation on a stand-alone device adapted to perform the methods described herein.

As shown in FIGS. 1A-1C, the trip planning system 100 includes a computer system 102, which is capable of implementing the exemplary method described below. The computer system 102 may include a computer server, workstation, personal computer, laptop computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like. The exemplary computer system 102 includes a processor 104, which performs the exemplary method by execution of processing instructions 106 which are stored in memory 108 connected to the processor 104, as well as controlling the overall operation of the computer system 102.

Figure 2:
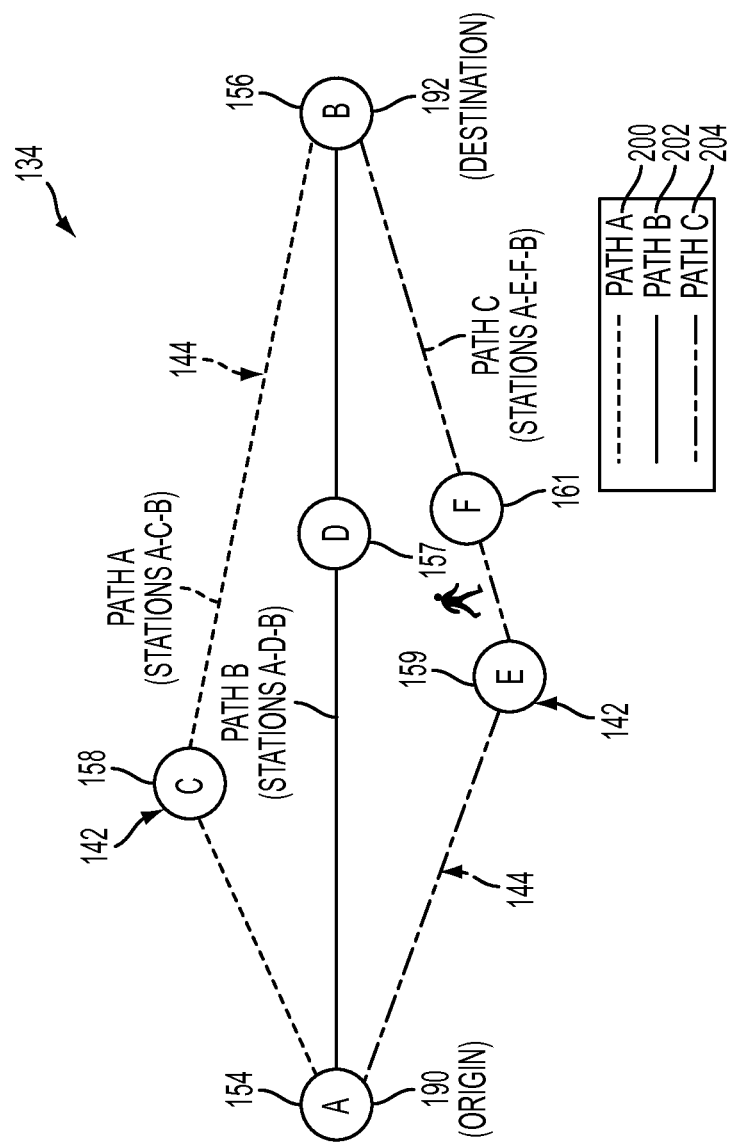
FIG. 2 is a functional diagram of an example transportation system for use in the crowdsourcing system for trip planning.

The instructions 106 include a validation sequence generator 110 that generates validation sequence information 145 from validation information 136 received from automatic ticketing validation systems 160-164, as discussed below. The validation sequence information 145 may be used by a path generator 112 to determine paths 144 between origins 190 and destinations 192 (FIG. 2).

A path 144, as used herein, may correspond to a sequence of successive origins and destinations between the path origin 190 and the path destination 192, where each origin and each destination correspond to a node of the transportation system 134, as illustrated more fully below with respect to FIG. 2. Additional description of the paths 144 defined by the path generator 112 in accordance with the validation sequence information 145 is set forth below.

The instructions 106 may also include a crowdsourcing component 114 that analyzes collected validation sequence information 145 and paths 144 generated by the path generator 112 to determine frequency 116, durations 117, and expected transfer times 118 of paths 144 between stations 142, 154-158. The crowdsourcing component 114 may process each validation sequence 145 determined for travelers on the transportation system 134 so as to determine crowdsource information corresponding to the expected transfer time 118 (in accordance with the durations 117) between two stations 142 using all possible paths 144 between those stations 142 on the transportation system 134, and to determine the frequency 116 with which travelers use each path 144. The crowdsourcing component 114 may output this crowdsource information to the trip planner component 115 or to memory accessible thereto, to allow for the selection of a more frequently selected path 144 between selected two stations.

It will be appreciated the crowdsourcing component 114 does not determine the path 144, but identifies a frequency 116 and expected transfer time 118 associated with the path 144. The crowdsourcing component 114 may use a distributed approach to determining a path 144 between the origin 190 and destination 192. One example crowdsourcing method is illustrated in "The rise of crowdsourcing," Jeff Howe, *Wired Magazine*, June 2006. The principle of crowdsourcing may be illustrated when individual users in a large community (the "crowd") generate multiple solutions and the crowd then sorts through these different solutions to select the most advantageous. In the context of the public transportation system 134 of FIGS. 1A-1C, it is assumed that most travelers exhibit reasonable behavior when planning daily trips. For example, if the fastest trip from A to B goes through C and not through D, then the number of passengers going from A to C to B will tend to be higher than the number of passengers going from A to D to B. However, other factors may affect the traveler's choice, such as the amount of walking a traveler has to do when making connections between stations or nodes on the path. The systems and methods set forth herein enable the determination of this information in accordance with collected validation information 136, as set forth in greater detail below. The functioning of the validation sequence generator 110, the path generator 112, the trip planner component 115, and the crowdsourcing component 114 will be better understood in conjunction with FIGS. 2-4B, as discussed in greater detail below.

The instructions may further include a trip planner component 115 that determines a candidate trip for a user to take, i.e., one or more paths 144 between a selected origin 190 and a selected destination 192. As discussed in greater detail below, the trip planner component 115 may facilitate the determination of one or more paths 144 between stations 142 associated with the selected origin and destination locations 148, using the candidate route plans 138, schedules 140, and services (e.g., bus, train, subway, etc.) associated with a transportation system 134. The trip planner component 115 may determine one or more paths 144 between the origin 190 and destination 192 in accordance with selections provided by the user and output one or more of these as a trip plan 198. It will be appreciated that when determining a trip between the selected origin 190 and the destination 192, the trip planner component 115 may use an abstract model of the transportation network 134, i.e., a model based on the routes 138 and schedules 140, in addition to the information provided by the crowdsourcing component 114.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 120, 122 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIGS. 2-3C.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The computer system 102 also includes one or more input/output (I/O) interface devices 120 and 122 for communicating with external devices. The I/O interface 120 may communicate with one or more of a display device 124, for displaying information, and a user input device 126, such as a keyboard or touch or writable screen, for inputting text, and/or a cursor control device, such as mouse, trackball, or the like, for communicating user input information and command selections to the processor 104. The various components of the computer system 102 may all be connected by a data/control bus 128. The processor 104 of the computer system 102 is in communication with an associated database 130 via a link 132. A suitable communications link 132 may include, for example, the public switched telephone network, a proprietary communications network, infrared, optical, or other suitable wired or wireless data transmission communications. The database 130 is capable of implementation on components of the computer system 102, e.g., stored in local memory 108, i.e., on hard drives, virtual drives, or the like, or on remote memory accessible to the computer system 102.

The associated database 130 corresponds to any organized collections of data (e.g., validation sequence information, transportation system information (e.g., nodes or stations, schedules, routes), crowdsourcing information (e.g., possible paths, durations, frequency of travel, expected transfer times), and the like) used for one or more purposes. Implementation of the associated database 130 is capable of occurring on any mass storage device(s), for example, magnetic storage drives, a hard disk drive, optical storage devices, flash memory devices, or a suitable combination thereof. The associated database 130 may be implemented as a component of the computer system 102, e.g., resident in memory 108, or the like.

In one embodiment, the associated database 130 may include data corresponding to an associated transportation system 134, a collection of routes 138 (a sequence of stops at transportation nodes to be made by an individual vehicle along of a course of travel available on the transportation system 134), schedules 140 for each of these routes 138, transportation nodes, such as stations ($S_i, \ldots, S_j$) 142, paths (P) 144 (i.e., a sequence of successive origins and destinations between the first origin 190 and the last destination 192, as illustrated more fully below with respect to FIG. 2), path frequency 116, path duration 117, expected transfer times 118, and validation sequence information 136. For example, in the case of a public transportation system, the associated database 130 may include information relating to the public transportation system 134 such as public transportation routes (e.g., a known sequence of scheduled stops by an individual bus, subway, train, etc.) 138, schedules 140 that pertain to the arrival/departure times of buses, trams, subways, etc., of the transportation system 134 for these routes 138, public transportation stops (or stations) 142, i.e., fixed locations, or nodes, that are linked by the transportation system 134, and a set of paths 144 between two stations 142, each path 144 being associable with one or more transportation routes 138 (e.g., a path 144 may include beginning a journey by train at a first station (origin), riding the train (along the train's scheduled route) to a second station, transferring to a bus at the second station, and riding the bus (along the bus's scheduled route) so as to alight at a third station (destination)).

The database 130 may further include validation sequence information 145 corresponding to a set of ticket validation sequences (V=(O,T,D,T')) that may be derived by the validation sequence generator 110 from the validation information 136 collected from various collection components (e.g., the automatic ticketing validation systems 160, 162, and 164 respectively located at station A 154, station B 156, station C 158, and the like), and comprise, for example, timestamps (T,T') 146 representative of respective sequences of boarding and alighting timestamps, locations 148 representative of origins (O) and destinations (D) corresponding to the timestamps, sequence tags 150, and a ticket identifier 152 corresponding to each validation sequence (V) 145. For example, in the context of a public transportation system, the validation sequence information 145 may pertain to travelers, such as each ticket's unique identification 152 (e.g., the ticket identification 152 may be derived from a smart card, a transit card, transit ticket, or the like, that cannot be rewritten or otherwise altered by the user (anti-counterfeiting properties)), locations 148 (origin and destination locations), sequence tags 150 (first use, correspondence use, etc., as explained in greater detail below), timestamps 146 associated with the transfer times between an origin and a destination for that particular validation sequence 145. That is, each validation sequence 145 may include the time of entry of the traveler on the public transportation along with the corresponding location 148 or route 138 (i.e., station 142 on the route 138) at which the traveler boarded or alighted, and the like. While each traveler on a public transport system is generally a person, travelers of other networked transportation systems may include goods or other inanimate objects. The.

Each location 148 of the validation sequence information 145 may include one or more of a route identifier e.g., a route number, a transportation node identifier, e.g., a stop number, an address, GPS coordinates, or other geographical identification information associated with the location. The time component of the stamp 146 may include one or more of a time of day, a day, a date, or other temporal information corresponding to the stamp 146. The validation sequence information 145 determined from collected validation information 136 and used in the method may thus be ticketing data, collected via usage of prepaid cards, single use transit tickets, reloadable transit cards, or other ticketing devices. The sequence tags 150 may reflect where or when in the sequence 145 the boarding or alighting of the traveler occurred, i.e., a "First" tag may indicate the first use of the ticket identification 152, whereas a "Correspondence" tag may indicate the second and each subsequent use of the ticket identification 152 within a specified time period.

The validation information 136 may be collected from a plurality of locations, illustrated in FIGS. 1A-1C as station A 154, station B 156, and station C 158. Each of these locations 154-158 may correspond to a respective one of a finite set of locations (e.g., stations 142) connected by the transportation system 134, or vehicles which travel along routes 138 of the transportation system 134. It will be appreciated that the collection of such information 136 may be performed by ticket validation machines for fare collection, i.e., automatic ticket validation systems 160, 162, and 164 at each respective location 154, 156, and 158, such as smart card readers, magnetic card readers, input terminals, ticket dispensers, ticket readers, and the like. It will be appreciated that such automatic ticket validation systems 160, 162, and 164 may be implemented at stations 154, 156, and 158, on vehicles, etc., and may represent automatic fare collection subsystems, as described in "Bus passenger origin-destination matrix estimation using automated data collection systems," Alex Cul, *In MIT. Dept. of Civil and Environmental Engineering*, MS thesis, 2006.

Exemplary travelers 166, 168, and 170 on the transportation system 134 use transportation cards/tickets, which are used to pay for or otherwise enable travel on the transportation system 134 and thus are scanned, read, inserted in, or otherwise detected by the automatic ticket validation systems 160, 162, and 164 as the travelers 166-170 travel through the transportation system 134 from an origin location (e.g., station $S_i$) to a destination location (e.g., station $S_j$). Such transportation cards may include smart card-like capabilities, e.g., microchip transmissions, magnetically stored data, and the like. In such embodiments, the automatic ticket validation systems 160-164 communicate validation sequence information 136 to the computer system 102 via respective links 172, 174, and 176. Suitable communications links 172, 174, and 176 may include, for example, the public switched telephone network, a proprietary communications network, infrared, optical, or any other suitable wired or wireless data transmission communications.

It will be appreciated that additional information may be collected by the automatic ticket validation systems 160-164 corresponding to ticketing operations including transportation usage data, ticketing receipt data, congestion data, and the like. According to one embodiment, both entries and exits of passengers on and off vehicles or nodes of the transportation system 134 may be collected as validation information 136. Entry-only systems, in contrast, may allow for the collection of electronic validation records pertaining only to the entry of a traveler 166, 168, or 170 on a vehicle or at an origin node of the transportation system 134. "Mining public transport user behaviour from smart card data," Catherine Morency Bruno Agard and Martin Trepanier, *in 12th IFAC Symposium on Information Control Problems in Manufacturing INCOM*, 2006 and "Mining public transport usage for personalised intelligent transport systems," Neal Lathia, Jon Froehlich, and Licia Capra, *in ICDM*, pages 887-892, 2010, illustrate variations on entry-only and entry and exit public transportation systems. While the destinations of travelers 166-170 in an entry-exit system may be discernible from the automatic ticketing validation data, i.e., the validation information 136 collected by the automatic ticket validation systems 160-164, whereas destinations of passengers in an entry-only automatic ticketing validation system 160-164 may be discerned through inferences based upon non-validation data (e.g., transportation system routes and schedules, event occurrences (sports, concerts, etc.), or the like) and traveler assumptions.

The systems and methods described herein may use one-trip tickets as well as prepaid cards, which are reflected in the ticket identification 152 included in the collected validation information 136. A one trip ticket may have a fixed validation time, i.e., a period of time during which the ticket remains valid for use by a traveler. For example, in entry-only systems, the time during which the ticket is valid may be limited to 1 hour from the time of issuance/purchase, during which time travelers 166-170 may change vehicles within the transportation network 134 without incurring an additional charge. The first validation of such a ticket may be identified by a sequence tag 150 indicating 'First', whereas the second and subsequent validations during this validation time may be identified by a sequence tag 150 indicating 'Correspondence'. The automatic ticketing validation systems 160, 162, and 164 may allow for the use of multiple entry cards, which may provide for multiple entries by a traveler 166-170 and long-term permanent cards to requesting travelers. It will be appreciated that the use of multiple entry cards may permit tracking traveling data of each card holding traveler 166-170, as well as allowing for time-based analysis of such travelers 166-170.

The automatic ticketing validation systems 160-164 may allow for location identification, corresponding to the entry or the entry and exit of a traveler 166-170. For example, the automatic ticketing validation systems 160-164 may enable each validation of a ticket to include a ticket ID 152, a timestamp 146 and a correspondence tag 150. Additionally, the automatic ticketing validation systems 160-164 can use automatic vehicle location subsystems to associate a ticket validation with the public transportation route 138, stop identifier (e.g., station 142) and direction. Other methods for collecting validation information 136 may alternatively or additionally be used, including, mobile communication events, e.g., time-stamped antenna authentication sequences or other observations of the intersecting of scheduled activities and traveler schedules. The ticket validations, i.e., the validation information 136 collected in the automatic ticketing validation systems 160-164 may provide information for understanding the traveler flows in the transportation network 134. Information in a typical installation can be analyzed in order to provide valuable insights for the transit and public transportation agencies and assist in decision making processes.

The validation sequence information 145 derived from the validation information 136 by the validation sequence generator 110 associated with the implementation of FIGS. 1A-1C is for example purposes only. Other applications outside of the public transportation example are also contemplated. For example, toll-road monitoring and management systems may also take advantage of the subject systems and methods, whereby validation information 136 is collected at toll-booths, upon entry and exit of a vehicle with respect to the associated toll road. Other embodiments, e.g., hospital monitoring of patient/employee entries and exits, secure facility monitoring, and the like, are also contemplated.

As illustrated in FIGS. 1A-1C, the trip planning system 100 may include or communicate with one or more user access devices 178, depicted in FIGS. 1A-1C as a portable communication device, e.g., a mobile smartphone, which is capable of interacting with the computer system 102 via a suitable link 180. Device 178 is representative of any personal computing device, such as a personal computer, a netbook computer, a laptop computer, a workstation computer, a personal data assistant, a web-enabled cellular telephone, a tablet computer, a proprietary network device, or other web-enabled electronic device. The data communications link 180 between the computer system 102 and the user access device 178 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications.

The user device 178 may include a processor 182, system memory 184, system storage, buses that couple various system components including the system memory 184 to the processing unit 182, and the like. The user device 178 may be suitably configured to interact with the computer system 102, to access the database 130, submit trip requests 188, receive a trip plan 198, and the like. Specifically, the user device 178 may include a web-browser, dedicated application, or other thin client interface 186, e.g., stored in memory 184, which is operable to interact with the computer system 102. The thin client 186 may be suitably configured to display a graphical representation of the associated transportation system 134, routes 138, schedules 140, paths 144 between selected origin/destination locations 148, and the like. Processor 182 and memory 184 can be configured as set forth above with respect to the processor 104 and memory 108 of the computer system 102.

In accordance with one embodiment, a user of the system 100, e.g., a person wishing to determine a suitable trip between a desired origin 190 and a desired destination 192 at a selected departure time 194, may submit a trip request 188 for processing by the computer system 102. The trip request 188 may be submitted via the link 180 or directly input to system 102. The trip request 188 serves as a request for possible paths 144 between a selected origin 190 (corresponding to a station 142 on the system 134) and a selected destination 192 (corresponding to another station 142), which route paths 144 may include any number of intervening stations 142 stored in the database 130. In such an embodiment, the trip request 188 may include an origin (O) 190, a destination (D) 192, desired departure time 194, and optionally, a selected service preference 196 (e.g., bus only, tram only, subway only, etc.). The trip request 188 may be input by the user via access to the thin client 186 operable on the user device 178 in data communication with the computer system 102, via user interactions with the user input device 126 with results displayed on the display device 124, or the like.

FIG. 2 provides an example of paths 144 in a transportation system 134 between an origin 190 (depicted as station A 154) and a destination 192 (depicted as station B 156). The transportation system 134 of FIG. 2 provides three paths 144 (depicted as path A 200, path B 202, and path C 204) between the origin 190 at station A 154 and the destination 192 at station B 156. Path A 200 depicts travel between stations A and B 154, 156 with a transfer at station C 158, e.g., a traveler boards a train at station A 154, alights at station C 156 to transfer to a bus and completes the journey to station B 156. Path B 202 depicts travel between stations A and B 154, 156 with a transfer at station D 157, e.g., a traveler boards a train at station A 154, alights at station D 156 to transfer to a bus and completes the journey to station B 156. Similarly, path C 200 depicts travel between stations A and B 154, 156 with a transfer at station E 158, e.g., a traveler boards a train at station A 154, alights at station E 159 and walks a distance to station F 161 to transfer to a bus to complete the journey to station B 156.

Figure 3A:
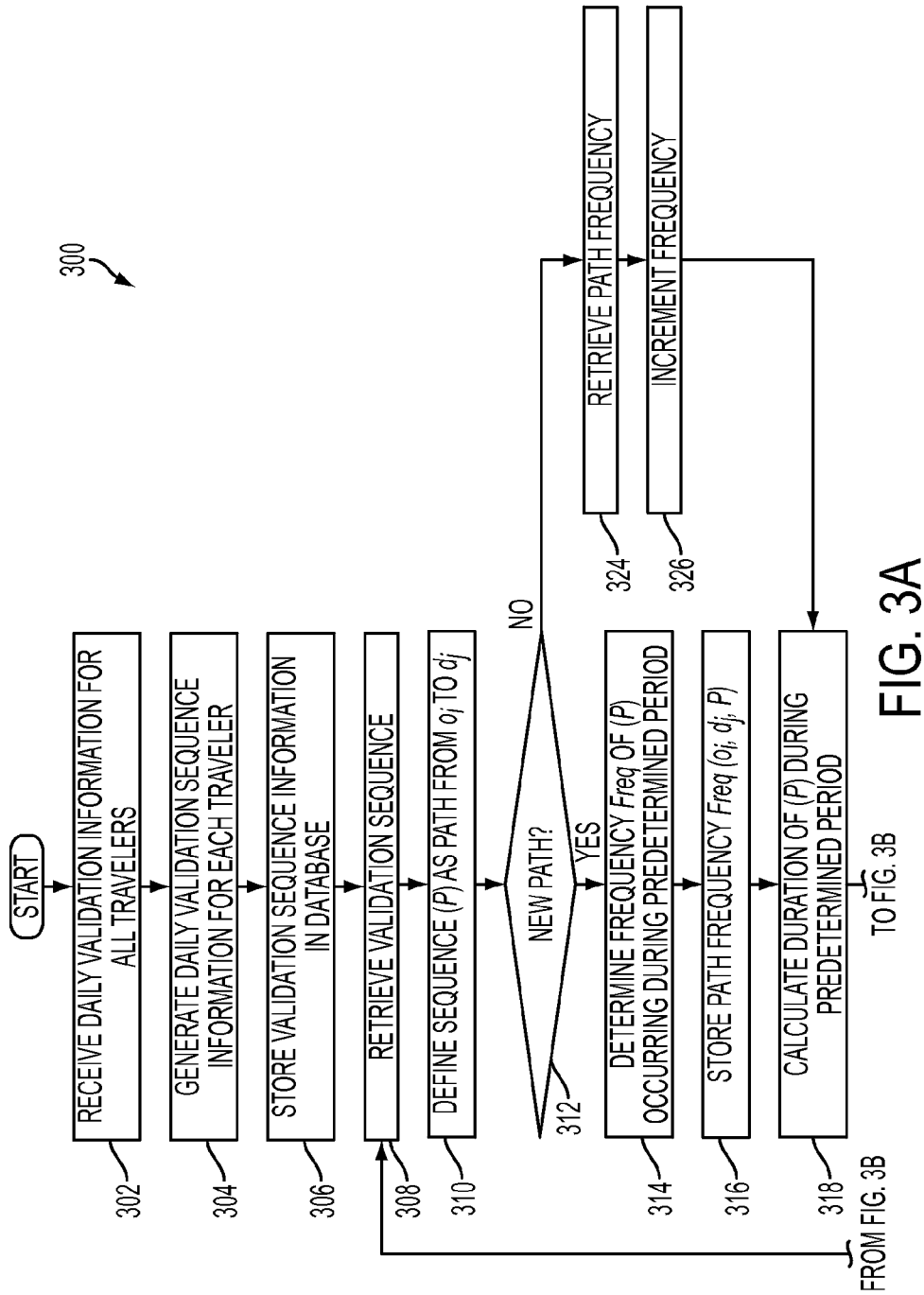
Figure 3C:
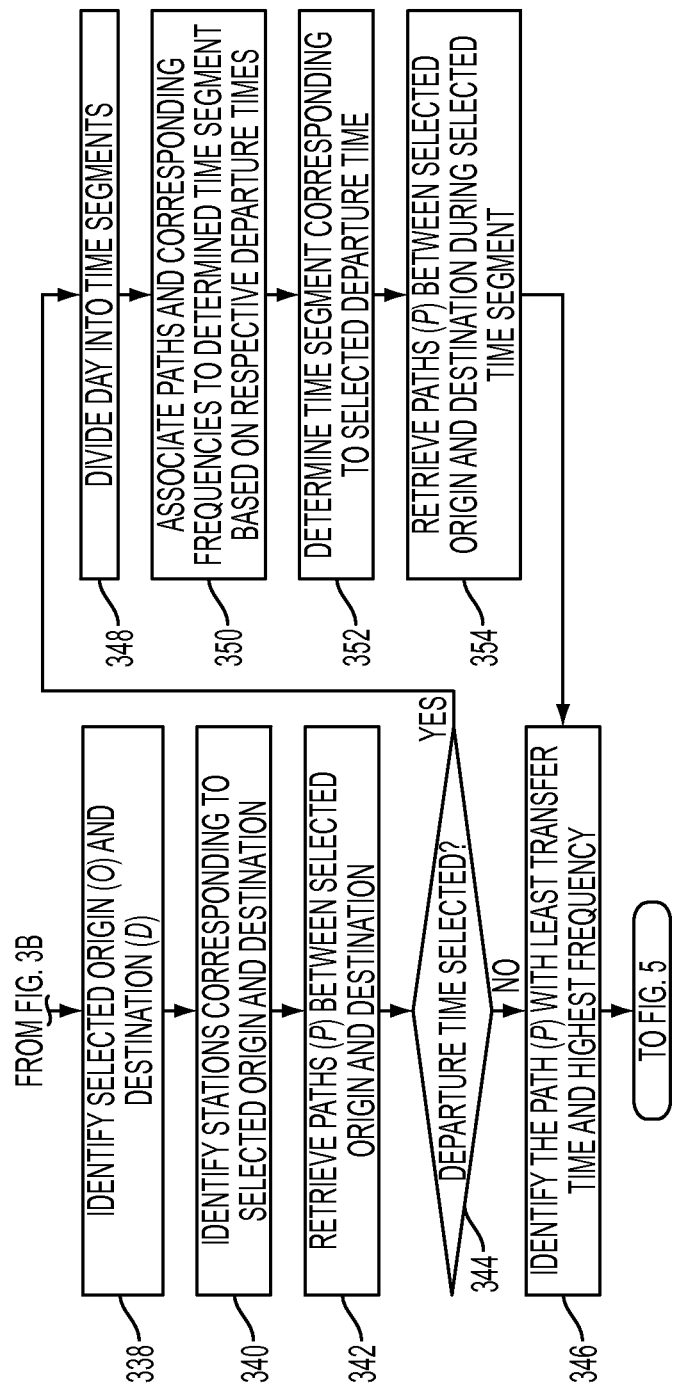

Referring now to FIGS. 3A-3C, there is provided an overview of the exemplary method 300. The method 300 begins at 302, whereupon validation information 136 from by the automatic ticking validation systems 160-164 is received, which validation information 136 includes both boardings and alightings of each traveler 166-170 during a selected training period. Reference may be made hereinafter to Algorithms 1 and 2, set forth below, which reflect one particular embodiment of the validation information 136 including boarding and alighting information (locations 148, sequence tags 150, etc.) with the corresponding timestamps 146, for every traveler 166-170 (e.g., ticket identification 152) during the training period, e.g., a predetermined period of time, such as one day, day segment, week, month, etc.

At 304, a daily validation sequence 145 is generated by the validation sequence generator 110 for each individual traveler 166-170, where the validation sequence 145 is represented as a 4-tuple V=(O,T,D,T') where O=($o_1, \ldots, o_n$) and D=($d_1, \ldots, d_n$) are origins 190 and destinations 192 of trips and T=($t_1, \ldots, t_n$) and T'=($t_1', \ldots t_n'$) are sequences of boarding and alighting timestamps 146 respectively corresponding to the sequence of origins (O) and the sequence of destinations (D). The validation sequence 145 is then stored in the associated database 130 at 306. It will be appreciated that while illustrated as a daily occurrence, the generation of validation sequences 145 may be performed at any predetermined schedule, e.g., hourly, daily, weekly, monthly, or other period of time. A validation sequence 145 is then retrieved from the associated database 130 at 308. That is, one of the daily validation sequences 145 for a traveler 166-170 is retrieved from the database 130, or more particularly, a set of validation sequences.

A sequence (P) is then defined as a path 144 from $o_i$ to $d_j$ at 310 for the validation sequence information 145 retrieved from the associated database 130 by the path generator 112. It will be appreciated that each o of path P may correspond to a station ($S_i, \ldots, S_j$) 142, and each d may correspond to a station ($S_i, \ldots, S_j$) 142. That is, each origin $o_i$ may correspond to any one of the stations ($S_i, \ldots, S_j$) on the network 134, and each destination $d_j$ may likewise correspond to any one of the stations ($S_i, \ldots S_j$), e.g., the destination $d_1$ from origin $o_1$ precedes the origin $o_2$ for destination $d_3$, and so on such that station $S_1$ may correspond to destination $d_1$ and be at or close to origin $o_2$, and the station $S_2$ may correspond to destination $d_2$ and be at or close to origin $o_3$, and the like.

A determination is then made at 312 whether the defined path (P) 144 is a new path, i.e., a path that has not previously been defined between an origin $o_i$ and a destination $d_j$. Upon a determination that the path (P) 144 is new, operations proceed to 314. At 314, a frequency 116 of the defined new path (P) 144 occurring is then determined via the crowdsourcing component 114, e.g., frequency Freq($o_i,d_j$,P) 116 of this path (P) 144 is initialized so as to indicate a single occurrence of the path (P) 144 has been detected. The frequency Freq($o_i, d_j$, P) 116 is then stored in the database 130 at 316 in association with the new path (P). The duration 117 of the new path (P) is then calculated at 318. That is, the amount of time that it took for a traveler 166, 168, or 170 to travel from $o_i$ to $d_j$ is calculated from upon the validation sequence information 145. The determined duration 117 is then added to the set Duration($o_i, d_j$,P)=Ø of durations corresponding to the determined path (P) at 320. At 322, each station ($S_i, \ldots, S_j$) in the path (P) 144 is identified, e.g., each station through which the path (P) 144 passes is identified and stored in association with the path (P) 144.

A determination is then made at 328 whether another validation sequence 145 remains for processing. Upon a determination that at least one additional validation sequence 145 corresponding to another ticket identification 152, i.e., traveler 166-170, operations return to 308, whereupon the validation sequence 145 corresponding to the additional ticket identification 152, i.e., traveler 166-170 is retrieved from the database 130. Operations then proceed through 310 to define the path (P) 144 of the additional validation sequence 145 and to 312 for a determination whether the defined path (P) 144 is a new path. When it is determined at 312 that the defined path (P) 144 is not new, operations proceed to 324. At 324, the frequency Freq($o_i,d_j$,P) 116 at which the path (P) 144 occurs is retrieved from the associated database 130. At 326, the frequency Freq($o_i,d_j$,P) 116 is incremented to account for the additional occurrence of the path (P) 116 from $o_i$ to $d_j$, such that Freq($o_i, d_j$, P)=Freq($o_i, d_j$, P)+1. Operations then proceed to 318 so as to determine a duration 117 of the trip from $o_i$ to $d_j$, as set forth above.

Returning to 328, upon a determination that no additional validation sequences 145 remain for analysis, operations proceed to 330. At 330, the expected transfer time 118 of each path (P) 144 between each pair of stations ($S_i,S_j$) 142 is computed, based on the set of durations 117 for the path (P) 144. The expected transfer times 118 are then stored in the database 130 at 332. According to one embodiment, the expected transfer time 118 of a path (P) 144 may be computed using the low decile of the set Duration($S_i,S_j$,P)=Ø. That is, the average of the 10% fastest trips from ($S_i$) to ($S_j$) through path (P) 144, e.g., ($S_i$) to corresponds to ($o_i$) (i.e., the boarding station) and ($S_j$) corresponds to ($d_j$) (i.e., the alighting station). 302-332 may be better understood in conjunction with Algorithm 1, which illustrates that for each pair of stations 142 $S_i$ and $S_j$ (e.g., station A 154 and station B 156, station B 156 and station C 158, Station A 154 and station D 157, etc.), all possible paths 144 from $S_i$ to $S_j$ are identified, including the respective durations 117 of each path 144. For example, the triple ($S_i$, $S_j$, P) estimates the expected transfer time 118 from $S_i$ to $S_j$ through P. As depicted in Algorithm 1, a subsequence ($o_i, \ldots, d_1$), 1≤i≤j≤n is considered a valid transit trip from origin $o_i$ to destination $d_j$, whatever the duration from $d_j'-d_i$. Thus, it will be appreciated that the shortest trips have a lesser duration between $d_j'd_i$ and will occur more frequently in a validation dataset.

Algorithm 1 Trip Crowdsourcing from Validation Data

Input: a validation sequence V=(O,T,D,T') for every traveler's daily data

Output: Frequency and the expected transfer time for station $S_i$ to $S_j$ through every possible path P

```
1:  for each validation sequence V = (O,T,D,T') do
2:      for i := 1 : N, j := i : N do
3:          Define sequence P = (o_i,d_j, o_{i+1},....,d_j) as a path from o_i, to
    d_j [Please explain the sequence as presented, i.e., why is d_j presented
    twice in the sequence?]*
4:          if P is a new path from o_i, to d_j then
5:              Freq(o_i,d_j,P) = 0
6:              Duration(o_i,d_j,P) = Ø
7:          end if
8:          Freq(o_i,d_j,P) = Freq(o_i, d_j,P) + 1
9:          Add duration t_j' − t_i to set Duration(o_i,d_j,P)
10:     end for
```

-continued

```
11: end for
12: for every different path P from S_i to S_j do
13:    ExpTransferTime(S_i,S_j,P) := the low decile of
       Duration(S_i,S_j,P)
14: end for
15: return Freq and ExpTransferTime values for all triples (S_i,S_j,P)
```

It will be appreciated that Algorithm 1, presented above, considers subsequences $o_i, \ldots, d_j$ as real trips, since the passenger boarded at origin $S_i$ and alighted at destination $d_j$. However, for stations 142 that have lower numbers of travelers 166-170 departing or alighting, the dataset of validation sequence information 145 may be enlarged via consideration of stations 142 other than those in the validation sequences 145. Thus, the method 400 of FIGS. 4A-4B may include one or more extensions for collecting paths (P) 144 from origin $o_i$ to destination $d_j$. First, passenger trips passing by station $o_i$ on board of a bus and alighting at stop $d_j$ may be collected. Second, passenger trips boarding at $o_i$ and passing by $d_j$ on the same route 138 may be collected. Third, passenger trips passing by both stations $o_i$ and $d_j$ on the same route 138 may be collected. Accordingly, a determination is made at 334 whether a pass-by analysis is to be performed using the validation sequence information 145 to identify and incorporate those stations 142 that have a scarcity of travelers 166-170. It will be appreciated that use of pass-by station information may increase the amount of collected data for use in determining the frequencies 116, durations 117, and expected transfer times 118.

Figure 4A:
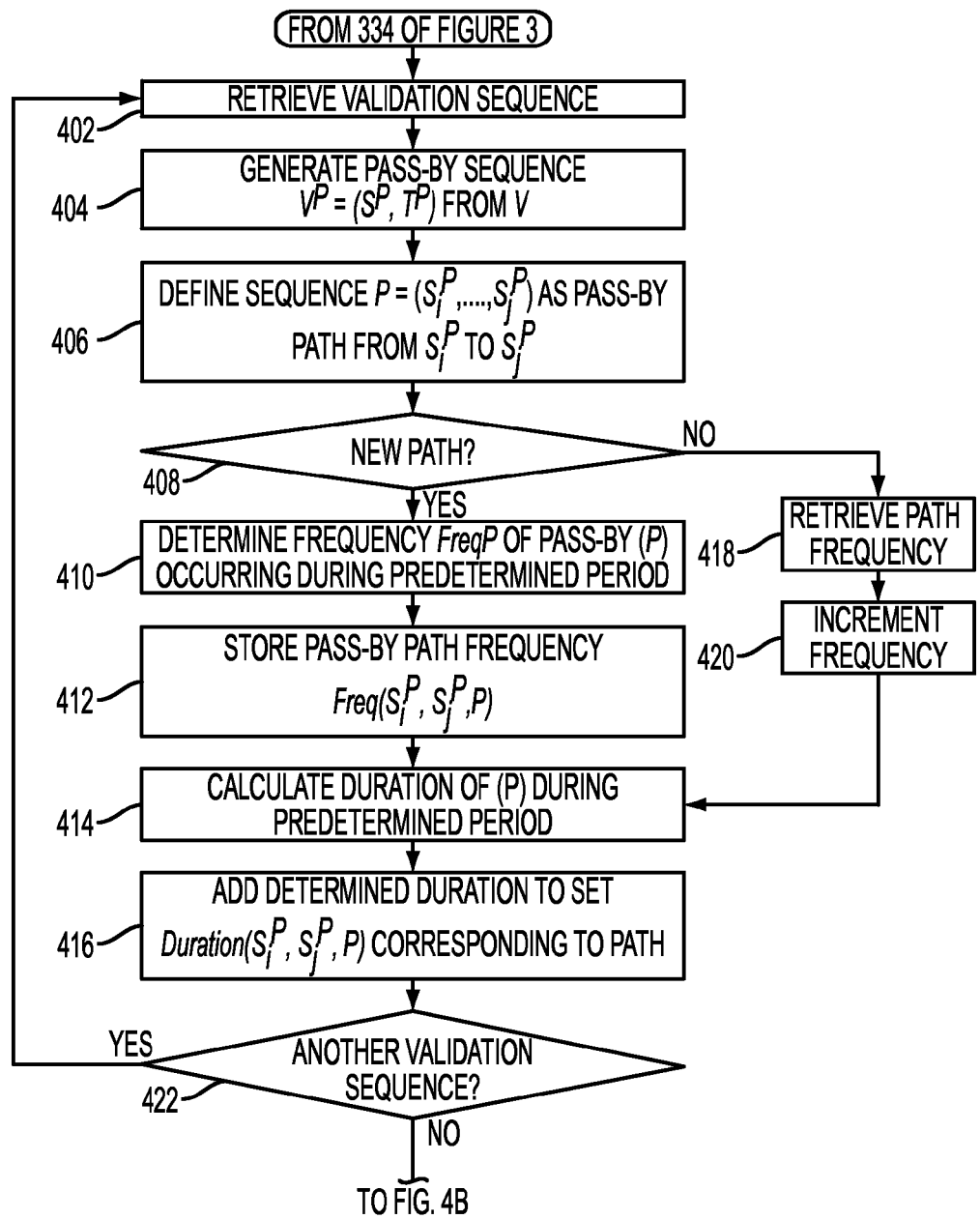
FIGS. 4A-4B is a flowchart which illustrates part of the method for crowdsourcing a trip on a transportation network.
Figure 4B:
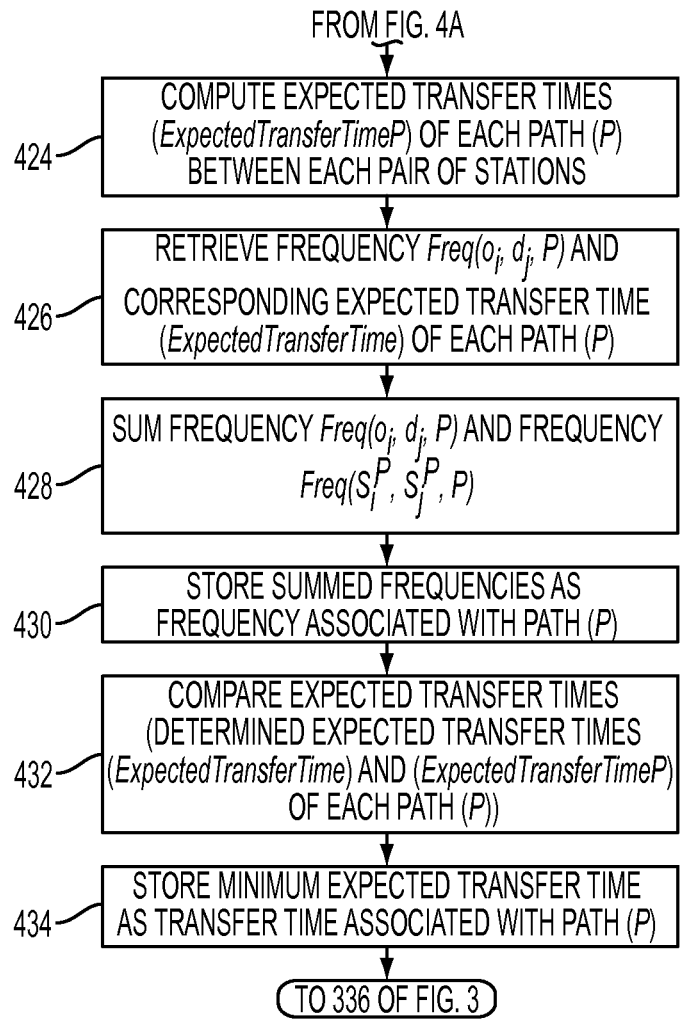

When it is determined that pass-by analysis is to be performed at 334, operations proceed to the flowchart 400 of FIGS. 4A-4B. At 402, a validation sequence 145 is then retrieved from the associated database 130. A pass-by sequence $V^P = (S^P, T^P)$ is then generated from the validation sequence information $V = (O,T,D,T')$ 145 at 404, where $S^P$ is representative of the station sequence and $T^P$ is representative of the corresponding timestamp sequence for the validation sequence information 145 of any traveler 166-170.

A sequence (P) is then defined as a pass-by path 144 from $S_i^P$ to $S_j^P$ at 406 for the pass-by sequence generated at 404 retrieved from the associated database 130. A determination is then made at 408 whether the defined pass-by path (P) is a new path 144, i.e., a path that has not previously been defined between $S_i^P$ between $S_j^P$. Upon a determination that the pass-by path (P) 144 is new, operations proceed to 410, whereupon a frequency (FreqP) 116 of the defined new pass-by path (P) 144 is determined. The frequency $\text{Freq}(S_i^P, S_j^P, P) = 0$ 116 is then stored in the database 130 at 412 in association with the new pass-by path (P). The duration 117 of the new pass-by path (P) is then calculated at 414. That is, the amount of time that it took for a traveler 166, 168, or 170 to travel from $S_i^P$ to $S_j^P$ is calculated based upon the pass-by sequence $V^P$ from the validation sequence information 145. The determined duration 117 is then added to the set $\text{Duration}(S_i^P, S_j^P, P) = \emptyset$ of durations corresponding to the pass-by path (P) 144 at 416.

A determination is then made at 422 whether another validation sequence 145 remains for processing. Upon a determination that at least one additional validation sequence 145 corresponding to another ticket identification 152, i.e., traveler 166-170, operations return to 402, whereupon the validation sequence 145 corresponding to the additional ticket identification 152, i.e., traveler 166-170 is retrieved from the database 130. Operations then proceed from 404 to 406 to generate the pass-by sequence $V^P$ from the additional validation sequence information 145 and to define the corresponding pass-by path (P) 144. A determination may then be made at 408 whether this defined pass-by path (P) 144 is a new path. When it is determined at 408 that the defined pass-by path (P) 144 is not new, operations proceed to 418. At 418, the frequency $\text{Freq}(S_i^P, S_j^P, P)$ 116 associated with the pass-by path (P) 144 is retrieved from the associated database 130. The retrieved frequency $\text{Freq}(S_i^P, S_j^P, P) = 0$ 116 is then incremented at 420 to reflect the additional occurrence of the pass-by path (P) 144 from stations $S_i^P$ to $S_j^P$, such that $\text{Freq}(S_i^P, S_j^P, P) = \text{Freq}(S_i^P, S_i^P, P) + 1$. Operations then proceed to 414 so as to determine a duration 117 of the trip from station $S_i^P$ to station $S_j^P$, as set forth above.

When it is determined at 422 that no additional validation sequences 145 remain, operations proceed to 424, whereupon the expected transfer times 118 of every different path (P) 144 from station $S_i^P$ to station $S_j^P$ are computed, which may then be stored in the associated database 130. As referenced above with respect to FIGS. 3A-3C and Algorithm 1, the expected transfer time $\text{ExpTransferTime}(S_i^P, S_j^P, P)$ 118 of a pass-by path (P) 144 may be determined using the low decile of the set $\text{Duration}(S_i^P, S_j^P, P)$, i.e., the average of the 10% fastest trips through path (P) 144 from $S_i^P$ to $S_j^P$. 402-424 may be better understood in conjunction with Algorithm 2:

Algorithm 2 Crowdsourcing from Pass-by Information
Input: a validation sequence $V = (O,T,D,T')$ for every traveler's daily data
Output: Frequency and the expected transfer time from station $S_i^P$ to $S_j^P$ through every possible path P

```
1: for each validation sequence V = (O,T,D,T') do
2:    Generate from V the pass-by sequence V^P = (S^P, T^P)
3:    for i := 1 : M, j := i + 1 : M do
4:        Define sequence P = (S_i^P,....,S_j^P) as a pass-by path from S_i^P to S_j^P
5:        if P is a new path from S_i^P to S_j^P then
6:            Freq( S_i^P,S_j^P,P) = 0
7:            Duration( S_i^P,S_j^P,P) = Ø
8:        end if
9:        Freq(S_i^P,S_j^P,P) = Freq(S_i^P,S_j^P,P) + 1
10:       Add duration t_j^P - t_i^P to set Duration(S_i^P,S_j^P,P)
11:   end for
12: end for
13: for every different path P from S_i^P to S_j^P do
14:    ExpTransferTime(S_i^P,S_j^P,P) := the low decile of Duration(S_i^P,S_j^P,P)
15: end for
16: return FreqP and ExpTransferTimeP values for all triples (S_i^P,S_j^P,P)
```

As will be appreciated, Algorithm 2 returns the same information as Algorithm 1, the frequency 116 and expected transfer time 118 for any triple $(S_i, S_j, P)$. The output of Algorithm 1 and the output of Algorithm 2 may therefore be combined for each such triple, so as to extend the amount of data available for determining a frequency and expected transfer time between any two stations, i.e., $S_i$ (origin in Algorithm 1) corresponds to $S_i^P$ and $S_j$ (destination in Algorithm 1) corresponds to $S_j^P$. Accordingly, at 426, the frequency $\text{Freq}(o_i, d_j, P)$ 116 and expected transfer time $\text{ExpTransferTime}(S_i, S_j, P)$ 118 corresponding to each path (P) 144 between stations $S_i$ and $S_j$, are retrieved from the associated database 130. The retrieved frequency $\text{Freq}(o_i, d_j, P)$ 116 for path (P) 144 from FIGS. 3A-3C is then summed with the pass-by frequency $\text{Freq}(S_i^P, S_j^P, P)$ 116 for path (P) 144 from FIGS. 4A-4B at 428. Thus, the frequency of occurrences where station $S_i$ is the origin and station $S_j$ is the destination is added to the frequency of occurrences where station $S_i$ is a first pass-by station $(S_i^P)$ and station $S_j$ is a second pass-by station $(S_j^P)$. This combined frequency 116 corresponding to path (P) 144 is then stored in the associated database 130 at 430.

At 432, the retrieved expected transfer time ExpTransferTime($S_i,S_j,P$) 118 for path (P) 144 from FIGS. 3A-3C is then compared to the expected transfer time ExpTransferTime($S_i^P, S_j^P,P$) 118 for path (P) 144 from FIGS. 4A-4B. Thereafter, at 434, the minimum expected transfer time 118 (lower of ExpTransferTime($S_i,S_j,P$) and ExpTransferTime($S_i^P,S_j^P,P$)) is stored as the expected transfer time 118 associated with path (P) 144 in the database 130. It may be appreciated that Algorithms 1 and 2 may be used separately, together, combined into a single algorithm, or used place of each other, such that pass-by information may be used to determine frequency alone, or in conjunction with boarding and alighting information collected in validation sequence information 145. Operations then return to 336 of FIGS. 3A-3C, as discussed in greater detail below.

Returning to FIGS. 3A-3C, when it is determined at 334 that pass-by analysis is not to be used, or after completion of the pass-by analysis of FIGS. 4A-4B, operations proceed to 336, whereupon a trip request 188 is received from the mobile device 178 that includes an origin (O) 190, destination (D) 192, a planned departure time 194, and (optionally) a service preference 196. The trip planner component 115 (discussed more fully in FIGS. 4A-4B) and the crowdsourcing component 114 then identify the origin (O) 190 and destination (D) 192 of the trip request 188 at 338. The stations 142 respectively corresponding to the selected origin (O) 190 and destination (D) 192 are then identified in accordance with routes 138 and stations 142 stored in the associated database 130. Based upon the identified stations 142, all or at least a set of possible paths (P) 144 between the origin (O) 190 and the destination (D) 192 in the database 130 are retrieved by the crowdsourcing component 115 at 340. According to one embodiment, the selected service preference 196 may be used to limit the stations 142 identified only to those stations 142 associated with a route 138 serviced by the service preference 196, e.g., only bus stations/stops, subway stations/stops, tram stations/stops, etc., or a combination thereof, are used for path 144 retrieval.

After retrieving all paths (P) 144 between the selected origin (O) 190 and destination (D) 192, a determination is made at 344 whether the user associated with the trip request 188 has indicated a desired time of travel, i.e., a departure time 194. In the event that a departure time was not included in the trip request 188, operations proceed to 346, whereupon the crowdsourcing component 114 identifies the path (P) 144 with the least expected transfer time 118 and the highest frequency 116 from among the retrieved paths (P) 144. Operations then proceed to 416 of FIGS. 4A-4B, as discussed in greater detail below.

Upon a determination at 344 that a departure time 194 was included in the trip request 188, operations proceed to 348. At 348, a day is divided into time segments, e.g., peak and off-peak times, hourly designations, etc. For example, the day (in accordance with the daily validation sequences 145 collected from each traveler 166-170) may be divided into K time segments $T_k$, k=1, . . . , K. The crowdsourcing component 114 may then collect paths 144 and corresponding frequency 116 and expected transit times 117 for every segment $T_k$. In such an example, path P from $S_i$ to $S_j$ is counted for the time segment ($T_k$) if the departure time t of (P) 144 is in segment ($T_k$) (even if the arrival time is in the next time segment, i.e., $T_{k+1}$). At 350, the paths (P) 144 and corresponding frequencies 116 are associated with the time segment ($T_k$) based upon the respective departure time 117 of the path (P) 144.

At 352, the time segment ($T_k$) corresponding to the departure time 194 included in the trip request 188 is determined. That is, the time segment ($T_k$) during which the departure time 194 falls is determined. Each path (P) 144 between the origin (O) 190 and the destination (D) 192 that occur during the determined time segment ($T_k$) are then retrieved from the database 130 at 354. That is, all or at least a set of possible paths (P) 144 that have a departure time during the determined time segment ($T_k$) that have same origin (O) 190 and destination (D) 192 identified in the trip request 188 are retrieved. The path (P) 144 having the least transfer time 118 and the highest frequency 116 of occurrence is then identified at 346, following which operations with respect to FIGS. 3A-3C proceed to 516 of FIG. 5, as discussed below.

Figure 5:
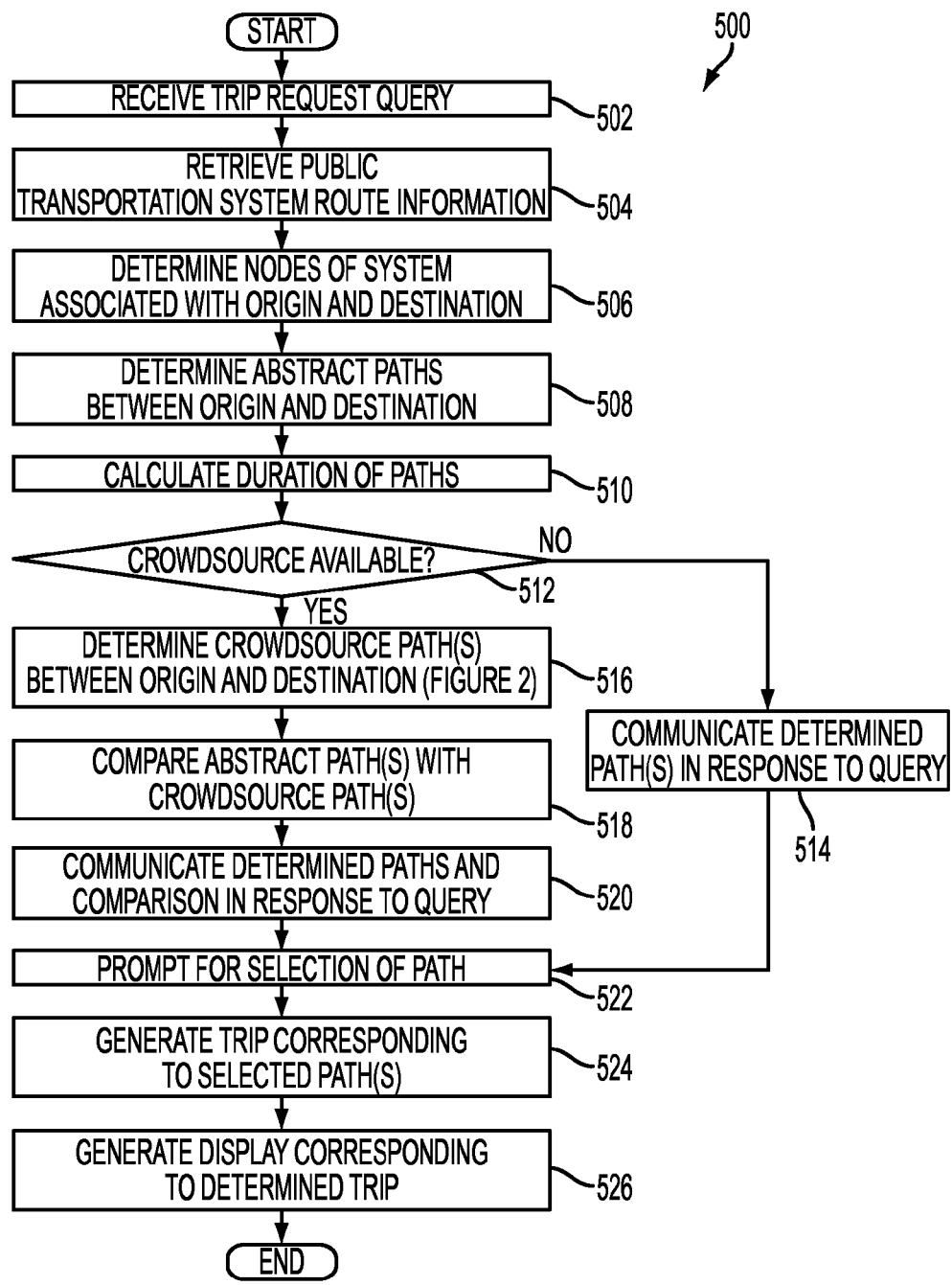
FIG. 5 is a flowchart which illustrates an example implementation of trip planning on a transportation network using crowdsourcing.

Turning now to FIG. 5, there is shown an example implementation of a method 500 for providing a crowdsourced trip in response to a trip request 188. Accordingly, operations begin at 502, whereupon the computer system 102, via the trip planner component 115, receives a trip request 188 from a mobile device 178. As addressed above, the use of a mobile device 178 is provided for example purposes only, and other user devices, as described above, may be used in accordance with the example implementation of FIG. 5. At 504, the trip planner component 115 retrieves route information 138 from the database. A determination is then made at 506 as to the nodes, i.e., stations/stops 142 of the routes 138 of the system 134, that correspond to the selected origin (O) 190 and destination (D) 192.

The trip planner component 115 then determines, at 508, one or more abstract paths (P) 144 from the information in the database 130, e.g., the routes 138, schedules 140, stations 142, etc., from the origin (O) 190 to the destination (D) 192 of the trip request 188. That is, the trip planner component 115 may use the routes 138/schedules 140 and other transit information (walking distance/time between the stations 142) to identify the top fastest abstract paths according to different choice criteria. Coupling of the trip planner component 115 to the crowdsourcing component 114, as set forth below, may validate the trips planned by the trip planner component 115 by supplying data corresponding to real trips. Accordingly, the abstract paths may be generated based solely on static transportation system information, i.e., routes, schedules, stations, and not paths 144 associated with the validation sequence information 145. It will be appreciated that the trip planner component 115 may further access previously determined paths 144 stored in the database 130, i.e., previously calculated paths 144 between stations 142, as addressed in FIGS. 3A-4B.

After determining the abstract paths, the trip planner component 115 calculates the duration of the paths from the origin (O) 190 to the destination (D) 192 at 510. The trip planner component 115 may calculate the duration of these abstract paths based upon the schedules 140 of the various buses, trams, trains, etc., transiting from the origin (O) 190 to the destination (D) 192. A determination is then made at 512 whether crowdsourcing information is available corresponding to any one of the abstract paths determined by the trip planner component 115. When no paths (P) 144 corresponding to the selected origin (O) 190 and destination (D) 192 are located in the database 130, operations proceed to 514, whereupon the trip planner component 114 communicates the determined abstract paths to the requesting device, i.e., the mobile device 178. In one embodiment, when the number of paths (P) 144 for a selected origin (O) 190 and destination (D) 192 pair exceeds a predetermined threshold e.g., three, five, ten, twelve, fifteen, etc., the paths (P) 144 may be ranked based upon respective frequencies 116 and/or expected transfer times 118, wherein the top (k) paths (P) 144 are communicated to the user for selection at 514.

After communication at 514, the user of the mobile device 178 is prompted to select one of the determined abstract paths at 522. For example, with reference to FIG. 2, the abstract paths may correspond to path A 200, path B 202, and path C 204. The trip planner component 115 may communicate these paths 200-204 to the mobile device 178 for selection thereof by the associated user. TABLE 1 illustrates an example output of abstract path information by the trip planner component 115, i.e., Departure/Arrival/Duration/Mode/Path:

TABLE 1

| Departure | Arrival | Duration | Mode | Path |
|---|---|---|---|---|
| 17:40 | 17:54 | 14 min | 1 change | Tram 1 + Bus 131 |
| 17:46 | 18:04 | 18 min | 1 change | Tram 1 + Bus 131 |
| 17:52 | 18:09 | 17 min | 1 change | Tram 1 + Bus 134 |

After receipt of the desired path, the trip planner component 115, based in part on the user selection, generates a trip corresponding to the selected path 200-204, e.g., the bus number, train number, route number, etc., to travel from the selected origin (O) 190 to the selected destination (D) 192 at 524. A display is then generated at 526 corresponding to the determined trip for the mobile device 178.

Returning to 512, upon a determination that crowdsourcing information, i.e., validation sequence information 145 associated with the selected origin (O) 190 and destination (D) 192, is available, operations proceed to 516. At 516, one or more paths (P) 144 between the origin (O) 190 and destination (D) 192, as determined in accordance with the method 300 set forth in FIGS. 3A-3C, are retrieved. The paths (P) 144 and abstract paths are compared at 418, and the result of the comparison is communicated from the trip planner component 115 in response to the received trip request 188 at 520. TABLE 2, illustrated below, extends TABLE 1 to illustrate the addition of crowdsourcing information (expected time of travel and percentage of travelers 166-170 using the respective paths) from the crowdsourcing component 114 to normal output of the trip planner component 115 (Departure/Arrival/Duration/Mode/Path). As shown in TABLE 2, the flow fraction represents the proportion of travelers who took a particular path between the origin (O) 190 and the destination (D) 192 (as indicated by the frequency 116) relative to the total number of travelers going between the same origin (O) 190 and the destination (D) 192 regardless of the path taken:

TABLE 2

| Departure | Arrival | Duration | Mode | Path | Expected time | Flow Fraction |
|---|---|---|---|---|---|---|
| 17:40 | 17:54 | 14 min | 1 change | Tram 1 + Bus 131 | 15 min | 7% |
| 17:48 | 18:04 | 18 min | 1 change | Tram 1 + Bus 131 | 18 min | 14% |
| 17:52 | 18:09 | 17 min | 1 change | Tram 1 + Bus 134 | 19 min | 11% |

It will be appreciated that the information returned to the user, as depicted in TABLES 1 and 2 may correspond to a single day, may represent a monthly average of validations, or the like. Thereafter, operations proceed from 522 through 526 as set forth in greater detail above.

It will be appreciated that the example implementation 500 of FIG. 5 may be performed without the trip planner component 115, i.e., a trip may be planned using only the crowdsourcing information output from FIGS. 3A-4B. Thus, provided the origin (O) 190, destination (D) 192 and departure time 194, the crowdsourcing component 114 may report the most frequent real trips (paths (P) 144 based on frequency 116) and accompany them with the expected transfer time (duration 117 and expected transfer time 118) and other information. In such an example, the crowdsourcing component 114 may facilitate a suitable trip in response to a trip request 188.

According to one embodiment described above, the coupling of the crowdsourcing component 114 and the trip planner component 115 offers multiple advantages. First, the combination allows for detection of when validation data, e.g., the validation sequence information 145 differs from the planner suggestions, e.g., the abstract paths determined by the trip planner component 115. Such differences may be caused by the incorrect estimation of network model parameters or the passenger preferences, and the like. Second, mining the validation data represents a valuable source of information for transportation agencies. Such agencies may use the crowdsourcing information to calibrate and tune the trip planner component 115, to make better suggestions, to offer additional services to travelers 166-170, to better inform travelers 166-170, and the like.

The method illustrated in FIGS. 3A-5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3-5, can be used to implement the method for crowdsourcing a transportation network.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A method for crowdsourcing a transportation network, comprising:
acquiring validation sequences for each of a plurality of travelers on the transportation network during a training period, at least some of the validation sequences includ- ing a plurality of origins, a plurality of destinations, and boarding and alighting timestamps corresponding thereto;

with a processor, defining a validation sequence path as a sequence of successive origins and destinations for each of the generated validation sequences;

determining a frequency of each validation sequence path occurring during the training period;

calculating a duration of each validation sequence path in accordance with the boarding and alighting timestamps associated therewith;

computing an expected transfer time for each validation sequence path between a first of the origins and a last of the destinations on the transportation network from the corresponding determined durations for a plurality of the validation sequences; and storing crowdsource information corresponding to each validation sequence path in an associated database, the crowdsource information including the determined frequency of occurrence and the expected transfer time.

2. The method of claim 1, wherein computing the expected transfer time for each validation sequence path further comprises calculating a low decile of the corresponding durations.

3. The method of claim 1, further comprising determining if a defined validation sequence path has previously occurred, wherein determining a frequency of each validation sequence path further comprises incrementing the frequency of occurrence of the validation sequence path when the validation sequence path has previously occurred.

4. The method of claim 1, further comprising:
receiving, from an associated user device, a trip request including an origin, a destination, and a time of departure;
identifying a pair of stations on the transportation network respectively corresponding to the origin and the destination;
retrieving crowdsourcing information corresponding to each validation sequence path between the identified pair of stations corresponding to the requested origin and the destination from the associated database; and
generating a trip plan from the origin to the destination in accordance with at least one validation sequence path based upon the retrieved crowdsourcing information.

5. The method of claim 4, wherein the at least one validation sequence path of the trip plan is selected in accordance with the crowdsource information indicating a least expected transfer time and a more frequent occurrence of travel by the plurality of travelers.

6. The method of claim 4, wherein defining the validation sequence path further comprising:
segmenting the training period into a set of time segments;
associating each validation sequence path with a time segment in accordance with the boarding timestamp of the validation sequence corresponding thereto; and
determining a time segment corresponding to the time of departure, wherein retrieving each validation sequence path between the identified pair of stations further includes retrieving each validation sequence path associated with the determined time segment corresponding to the time of departure.

7. The method of claim 4, further comprising:
retrieving, from the associated database, route information corresponding to a route of predetermined sequences of stops at corresponding stations of the transportation system;
determining at least one abstract path between the pair of stations on the transportation network respectively corresponding to the origin and the destination in accordance with the retrieved route information;
comparing the at least one abstract path to the at least one validation sequence path based upon the crowdsource information; and
communicating, in response to the trip request, a result of the comparison to the requesting user device, the result indicative of a projected transfer time associated with the at least one abstract path relative to the determined transfer time associated with the at least one validation sequence path.

8. The method of claim 7, further comprising retrieving, from the associated database, schedule information associated with each abstract path between the identified pair of stations corresponding to the requested origin and the destination, the schedule information including scheduled departure and arrival times at the stations, wherein determining the at least one abstract path between the pair of stations on the transportation network further comprises determining the at least one abstract path in accordance with the time of departure relative to the retrieved schedule information.

9. The method of claim 4, wherein the trip request further includes a service preference corresponding to a type of transportation on the transportation network, further comprising:
determining, for each validation sequence path, the type of transportation corresponding thereto; and
identifying the at least one validation sequence path between the pair of stations having a least determined transfer time and a highest determined frequency of occurrence in accordance with the corresponding type of transportation, wherein the type of transportation corresponds to at least one of a bus, a train, a subway, or a tram operating on the transportation system.

10. The method of claim 4, further comprising:
generating pass-by sequences from the validation sequences for each of the plurality of travelers on the transportation network, the pass-by sequences including a sequence of stations and corresponding timestamps;
defining a pass-by path as a sequence of successive stations for each of the generated pass-by sequences;
determining a pass-by frequency of each pass-by path occurring during a predetermined time period;
calculating a duration of each pass-by path in accordance with the timestamps associated therewith;
computing expected transfer times for each pass-by path between stations on the transportation network in accordance with the corresponding calculated durations; and
storing, in the associated database, each pass-by path in association with the corresponding determined pass-by frequency of occurrence and expected transfer time.

11. The method of claim 10, wherein computing the expected transfer times for each pass-by path further comprises calculating a low decile of the corresponding calculated duration.

12. The method of claim 11, further comprising;
summing the determined frequency and the determined pass-by frequency so as to determine a summed frequency of occurrence for each path; and
comparing the expected transfer time and the pass-by expected transfer time, so as to output a minimum expected transfer time for each path,
wherein generating a trip plan from the origin to the destination further including using identified paths between pairs of stations having least determined minimum expected transfer times and a highest summed frequency of occurrences.

13. The method of claim 4, further comprising:
receiving, for each traveler during the predetermined time period, validation information from at least one automatic ticketing validation system, the validation information including an origin location, a boarding timestamp, a destination location, an alighting timestamp, and a unique ticket identification,
wherein the validation sequence is generated in accordance with the received validation information.

14. The method of claim 4, further comprising:
retrieving a plurality of identified validation sequence paths between the requested origin and the requested destination from the associated database;
assigning a rank to each of the plurality of identified validation sequence paths in accordance with the crowdsource information associated therewith; and
communicating a preselected number of validation sequence paths of the plurality thereof in response to the trip request, the preselected number of validation sequence paths including those validation sequence paths with a highest assigned rank.

15. A computer program product comprising a non-transitory recording medium storing instructions, which when executed on a computer causes the computer to perform the method of claim 1.

16. A system comprising memory storing instructions for performing the method of claim 1, and a processor in communication with the memory which implements the instructions.

17. A crowdsourcing trip planning system, comprising:
a sequence generator component configured for generating validation sequences for each of a plurality of travelers on a transportation network during a training period, at least some of the validation sequences including a plurality of origins, a plurality of destinations, and boarding and alighting timestamps corresponding thereto;
a path generator component configured for defining validation sequence path as a sequence of successive origins and destinations for each of the generated validation sequences;
a crowdsourcing component configured for:
  determining a frequency of each validation sequence path occurring during the training period;
  calculating a duration of each validation sequence path in accordance with the boarding and alighting timestamps associated therewith;
  computing an expected transfer time for each validation sequence path between a first of the origins and a last of the destinations on the transportation network from the corresponding determined durations for a plurality of the validation sequences;
  storing, in an associated database, crowdsource information corresponding to each validation sequence path including the determined frequency of occurrence, and expected transfer time;
a trip planning component configured for:
  receiving, from an associated user device, a trip request including an origin, a destination, and a time of departure, identifying at least one validation sequence path corresponding to the requested origin and the destination, and generating a trip plan from the origin to the destination in accordance with the at least one identified validation sequence path between in accordance with the crowdsource information; and a processor which implements at least one of the sequence generator component, the path generator component, the crowdsourcing component, and the trip planning component.

18. The system of claim 17, wherein the memory further includes instructions executed by the processor for:
segmenting the training period into a set of time segments;
associating each validation sequence path with a time segment in accordance with the boarding timestamp of the validation sequence corresponding thereto; and
determining a time segment corresponding to the time of departure, wherein identifying at least one validation sequence path further includes identifying the at least one validation sequence path in accordance with the determined time segment corresponding to the time of departure.

19. The system of claim 17, wherein:
the sequence generator component is further configured for generating pass-by sequences from the validation sequences for each of the plurality of travelers on the transportation network, the pass-by sequences including a sequence of stations and corresponding timestamps;
the crowdsourcing component is further configured for:
  defining a pass-by path as a sequence of successive stations for each of the generated pass-by sequences,
  determining a pass-by frequency of each pass-by path occurring during a predetermined time period,
  calculating a duration of each pass-by path in accordance with the timestamps associated therewith, and
  computing expected transfer times for each pass-by path between stations on the transportation network in accordance with the corresponding calculated durations; and
the memory further includes instructions executed by the processor for storing, in the associated database, each pass-by path in association with the corresponding determined pass-by frequency of occurrence and expected transfer time.

20. The system of claim 17, wherein:
the trip planner component is further configured for retrieving, from the associated database, route information corresponding to a route of predetermined sequences of stops at corresponding stations of the transportation system;
the path generator component is further configured for determining at least one abstract path between a pair of stations on the transportation network respectively corresponding to the origin and the destination in accordance with the retrieved route information; and
the crowdsourcing component is further configured for comparing the at least one abstract path to the at least one validation sequence path between the pair of stations having a least determined transfer time and a highest determined frequency of occurrence, and communicating, in response to the trip request, a result of the comparison to the requesting user device, the result indicative of a projected transfer time associated with the at least one abstract path relative to the determined transfer time associated with the at least one validation sequence path.

21. A computer-implemented method for trip planning on a transportation network, comprising:
receiving, from an associated user device, a trip request including an origin, a destination, and a time of departure;

identifying a pair of stations on the transportation network respectively corresponding to the origin and the destination;

retrieving a validation sequence path between the identified pair of stations corresponding to the requested origin and the destination;

retrieving generated crowdsource information corresponding to the retrieved validation sequence path; and outputting a trip plan from the origin to the destination in accordance with at least one validation sequence path between the pair of stations selected in accordance with the retrieved crowdsource information, wherein the crowdsource information corresponding to the retrieved validation sequence path is generated by: acquiring validation sequences for each of a plurality of travelers on the transportation network during a training period, at least some of the validation sequences including a plurality of origins, a plurality of destinations, and boarding and alighting timestamps corresponding thereto; with a processor, defining the validation sequence path as a sequence of successive origins and destinations for each of the generated validation sequences; determining a frequency of each validation sequence path occurring during the training period; calculating a duration of each validation sequence path in accordance with the boarding and alighting timestamps associated therewith; and computing an expected transfer time for each validation sequence path between a first of the origins and a last of the destinations on the transportation network from the corresponding determined durations for a plurality of the validation sequences.

22. The computer-implemented method of claim 21, wherein defining the validation sequence path further comprises:

segmenting the training period into a set of time segments;

associating each defined path with a time segment in accordance with the timestamps of the validation sequence corresponding thereto; and determining a time segment corresponding to the time of departure, wherein identifying the at least one defined path between the pair of stations further includes identifying the at least one defined path associated with the determined time segment corresponding to the time of departure.

23. The computer-implemented method of claim 21, wherein the validation sequence further comprises origins, destinations, and boarding and alighting timestamps during the training period corresponding to each traveler, further comprising:

defining a validation sequence path as a sequence of successive origins and destinations for each of the generated validation sequences;

determining a frequency of each validation sequence path occurring during the training period;

calculating a duration of each validation sequence path in accordance with the boarding and alighting timestamps associated therewith;

computing expected transfer times for each validation sequence path between stations on the transportation network from the corresponding determined durations; and summing the frequency of each validation sequence path and the frequency so as to determine a summed frequency of occurrence for each path; and comparing the expected transfer time and the expected transfer time of the validation sequence path, so as to output a minimum expected transfer time for each path, wherein the at least one path between the pair of stations is identified in accordance with a least determined minimum expected transfer time and a highest summed frequency of occurrence, wherein generating a trip plan from the origin to the destination further including using identified paths between pairs of stations having least determined minimum expected transfer times and a highest summed frequency of occurrences.

\* \* \* \* \*